US008001184B2

(12) United States Patent
Etgen et al.

(10) Patent No.: US 8,001,184 B2
(45) Date of Patent: Aug. 16, 2011

(54) SYSTEM AND METHOD FOR MANAGING AN INSTANT MESSAGING CONVERSATION

(75) Inventors: Michael P. Etgen, Cary, NC (US); Steven M. Miller, Cary, NC (US); Renee L. Schwartz, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1147 days.

(21) Appl. No.: 11/341,264

(22) Filed: Jan. 27, 2006

(65) Prior Publication Data

US 2007/0180040 A1    Aug. 2, 2007

(51) Int. Cl.
*G06F 15/16* (2006.01)
(52) U.S. Cl. ......... 709/204; 709/205; 709/206; 709/207
(58) Field of Classification Search .................. 709/204, 709/206, 205, 207
See application file for complete search history.

(56) References Cited

U.S. PATENT DOCUMENTS

| 6,301,609 | B1 | 10/2001 | Aravamudun et al. | 709/206 |
|---|---|---|---|---|
| 6,484,196 | B1 | 11/2002 | Maurille | 709/206 |
| 6,769,012 | B1 * | 7/2004 | Liu et al. | 709/204 |
| 7,007,226 | B1 * | 2/2006 | Smith et al. | 715/206 |
| 7,328,242 | B1 * | 2/2008 | McCarthy et al. | 709/204 |
| 7,412,491 | B2 * | 8/2008 | Gusler et al. | 709/207 |
| 7,500,200 | B2 * | 3/2009 | Kelso et al. | 715/772 |
| 2002/0035605 | A1 | 3/2002 | McDowell et al. | 709/206 |
| 2003/0114174 | A1 * | 6/2003 | Walsh et al. | 455/466 |
| 2004/0006706 | A1 * | 1/2004 | Erlingsson | 713/200 |
| 2004/0015547 | A1 * | 1/2004 | Griffin et al. | 709/204 |
| 2004/0196315 | A1 | 10/2004 | Swearinger et al. | 345/804 |
| 2004/0228531 | A1 | 11/2004 | Fernandez et al. | 382/187 |
| 2004/0254998 | A1 | 12/2004 | Horvitz | 709/206 |
| 2005/0149620 | A1 * | 7/2005 | Kirkland et al. | 709/207 |
| 2007/0033250 | A1 * | 2/2007 | Levin et al. | 709/204 |
| 2007/0255791 | A1 * | 11/2007 | Bodlaender et al. | 709/206 |

FOREIGN PATENT DOCUMENTS

EP    1881658 A1 *    1/2008
JP    2004164562 A *    6/2004

OTHER PUBLICATIONS

Humphrey et al., Kernel-Level Threads for Dynamic, Hard Real-Time Environments University of Massachusetts, Amherst, MA 01003 Real-Time Systems Symposium, 1995. Proceedings., 16th IEEE Dec. 5-7, 1995.*

* cited by examiner

*Primary Examiner* — Wing F Chan
*Assistant Examiner* — Kostas Katsikis
(74) *Attorney, Agent, or Firm* — Patents on Demand, P.A.; Brian K. Buchheit; Scott M. Garrett

(57) ABSTRACT

The invention is a computer implemented system and process for managing a threaded instant messaging conversation. The process comprises establishing an interactive messaging session for exchanging a conversation element; assigning a thread identifier to the conversation element; appending the thread identifier to the conversation element; and displaying the conversation element in a user interface based on the thread identifier.

20 Claims, 6 Drawing Sheets

US 8,001,184 B2

SYSTEM AND METHOD FOR MANAGING AN INSTANT MESSAGING CONVERSATION

FIELD OF THE INVENTION

The present invention is related generally to demand-based messaging systems, and in particular to systems and methods for managing threaded instant messaging conversations.

BACKGROUND OF THE INVENTION

Demand-based messaging is a communication service that allows people to exchange message data, such as text, over a network or other communications media, in real time. Probably the most common medium for exchange is the Internet, but as wireless phone networks continue to expand, their popularity for text messaging is also expanding. U.S. Pat. No. 6,301,609 issued to Aravamudun et al., and U.S. Patent Publications Nos. 2002/0035605 and 2004/0254998, for example, illustrate the move toward an exchange medium that unifies traditional and wireless communications. Instant messaging (IM) is one widely known and used embodiment of demand-based messaging. Today, most network and online service providers offer some form of IM service. According to some estimates, the top three instant messaging service providers serve over forty million users. Instant messaging services also are being rapidly deployed and integrated into enterprise infrastructure. International Business Machines, Inc. (IBM), for example, has deployed LOTUS SAMETIME instant messaging applications for employees world-wide. Other examples of IM applications that are popular today include MSN Messenger and Yahoo/AOL Instant Messenger.

IM users typically use a networked computer and an IM client program to exchange messages with one another in conversational style. An IM client provides an interface for users to compose, send, receive, and read messages. In a graphical display, an IM client usually includes at least two windows: a window for composing and sending messages, and a window for displaying messages as users take turns sending and receiving them. IM sessions (colloquially referred to as "chats") are often lengthy, with multiple participants each taking many turns "speaking" in the chat window. Each turn or entry is referred to herein as a "conversation element".

As with any conversation, an IM session often consists of a series of questions, answers and comments over multiple topics. Replies to a question may have multiple responses from the same participant, because it is common to break up long thoughts into several conversation elements. Each conversation element displays instantly, in chronological sequence as each conversation element is written. When there are more than two participants in an IM session, responses to a question from the multiple participants may visually interrupt each other. An interruption can cause even further confusion when the interruption relates to a different topic than the prior and subsequent conversation elements in the sequence.

Other forms of electronic communication, such as newsgroups, handle the problem of interruptions and asynchronous responses by threading conversation topics. In a newsgroup, each conversation element, or "posting" is handled like email. The postings are sent to a common server, where participants, or "subscribers," can create, read and respond to postings. Newsgroup postings contain extensive header information, like an email, that contain subject lines, sender information, server routing information and time and date stamps. Newsgroup software uses the header information for routing the posting to the proper server for storage and access by subscribers to the newsgroup. Each original conversation element is assigned a topic in a subject line. Responses to the original conversation element are handled like the "reply to all" function in an email. Related conversation elements are visually assembled below the original conversation element in threads.

The threading mechanism employed by newsgroup software, though, does not lend itself to the real-time nature of IM. IM conversation elements do not contain the extensive header information used by newsgroups to organize postings by threads because IM systems employ an active open electronic connection between participating nodes. IM conversation elements generally do not require all the header information since the routing of the electronic communication is already established when the IM session starts.

Accordingly, a need exists for a system and method for managing threaded conversation elements of an IM session.

SUMMARY OF THE INVENTION

The invention described in detail below is a computer implemented system and process for managing a threaded instant messaging conversation. The process comprises establishing an interactive messaging session for exchanging a conversation element; assigning a thread identifier to the conversation element; appending the thread identifier to the conversation element; and displaying the conversation element in a user interface based on the thread identifier.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program"

includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the Instant Messaging Thread Manager ("IMTM").

Figure 1:
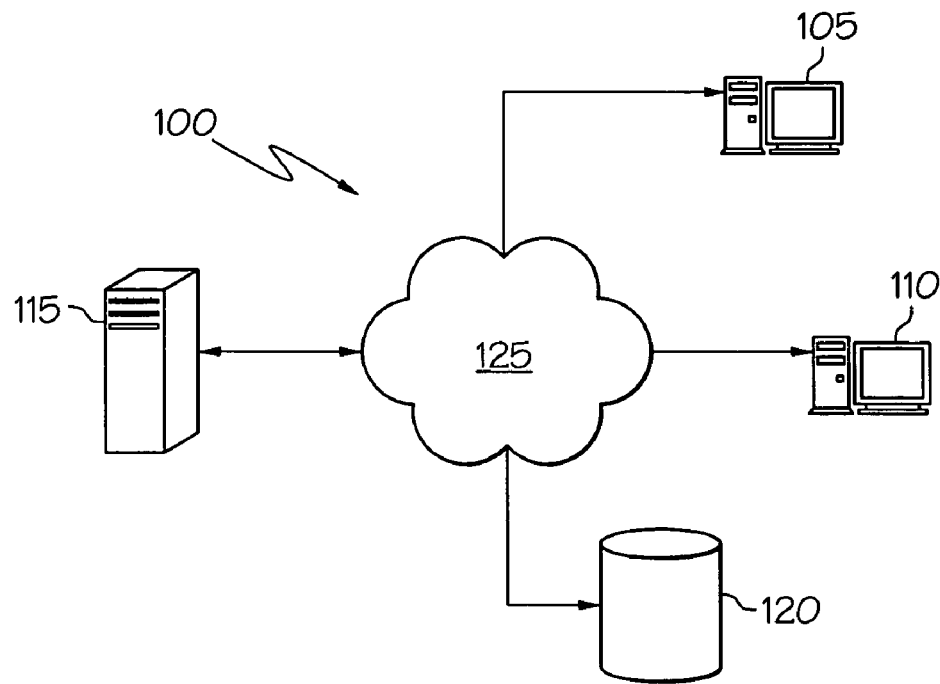
FIG. 1 represents an exemplary computer network.

Additionally, the IMTM is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
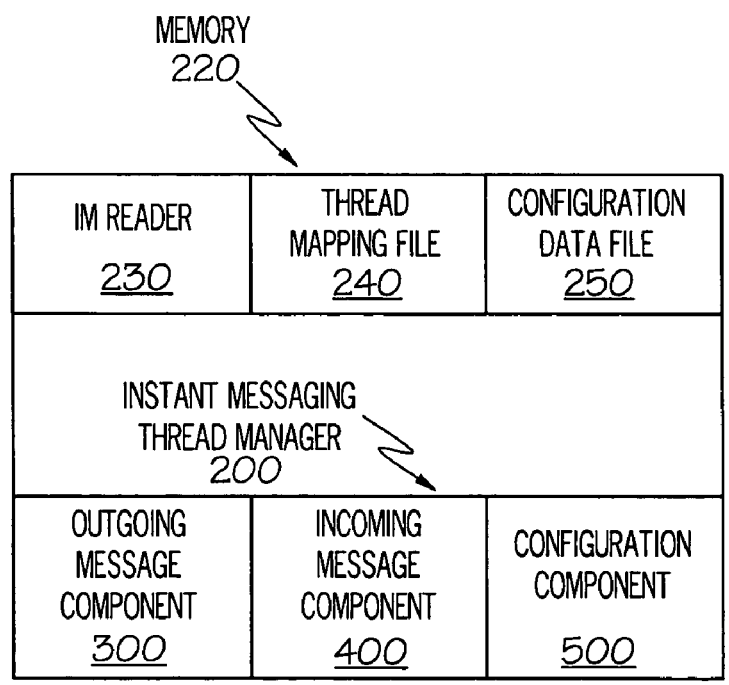
FIG. 2 describes programs and files in memory on a computer.

IMTM 200 typically is stored in a memory, represented schematically as memory 220 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of media. Thus, FIG. 2 is included merely as a descriptive expedient and does not necessarily reflect any particular physical embodiment of memory 220. As depicted in FIG. 2, though, memory 220 may include additional data and programs. Of particular import to IMTM 200, memory 220 may include IM Reader 230, Thread Mapping File 240 and Configuration Data File 250. IMTM 200 comprises the following components: Outgoing Message Component 300, Incoming Message Component 400 and Configuration Component 500.

IMTM 200 controls the visual appearance of IM Reader 230 so that a participant in an IM conversation can visually organize conversation elements of an IM session by threads. During the course of an IM session, participants can indicate when a new topic or thread begins. The creation of new threads should be quick and intuitive, employing standard object-oriented procedures such as: highlight, drag & drop; highlight & right-click—spawning a menu; and highlight & left click an icon. Once multiple threads are created, the invention should display each subsequent conversation element in groups by thread. Each thread can be displayed, for example in separate windows or sub-windows. Threads also could be organized within a single window, for example, by using a visual cue such as a text marker or color. New conversation elements in the same thread also may be added immediately below other conversation elements in the same thread, rather than below the most chronologically recent message element. Outgoing Message Component 300 assigns an outgoing conversation element to a thread and appends the conversation element with a thread identifier. Incoming Message Component 400 reads the thread identifier from an incoming conversation element and displays the conversation element visually in the proper thread. Configuration Component 500 allows participants to select preferences for displaying threads. Thread Mapping File 240 contains a listing of all threads in the active IM session. Configuration Data File 250 contains participant preferences for displaying threads.

Figure 3:
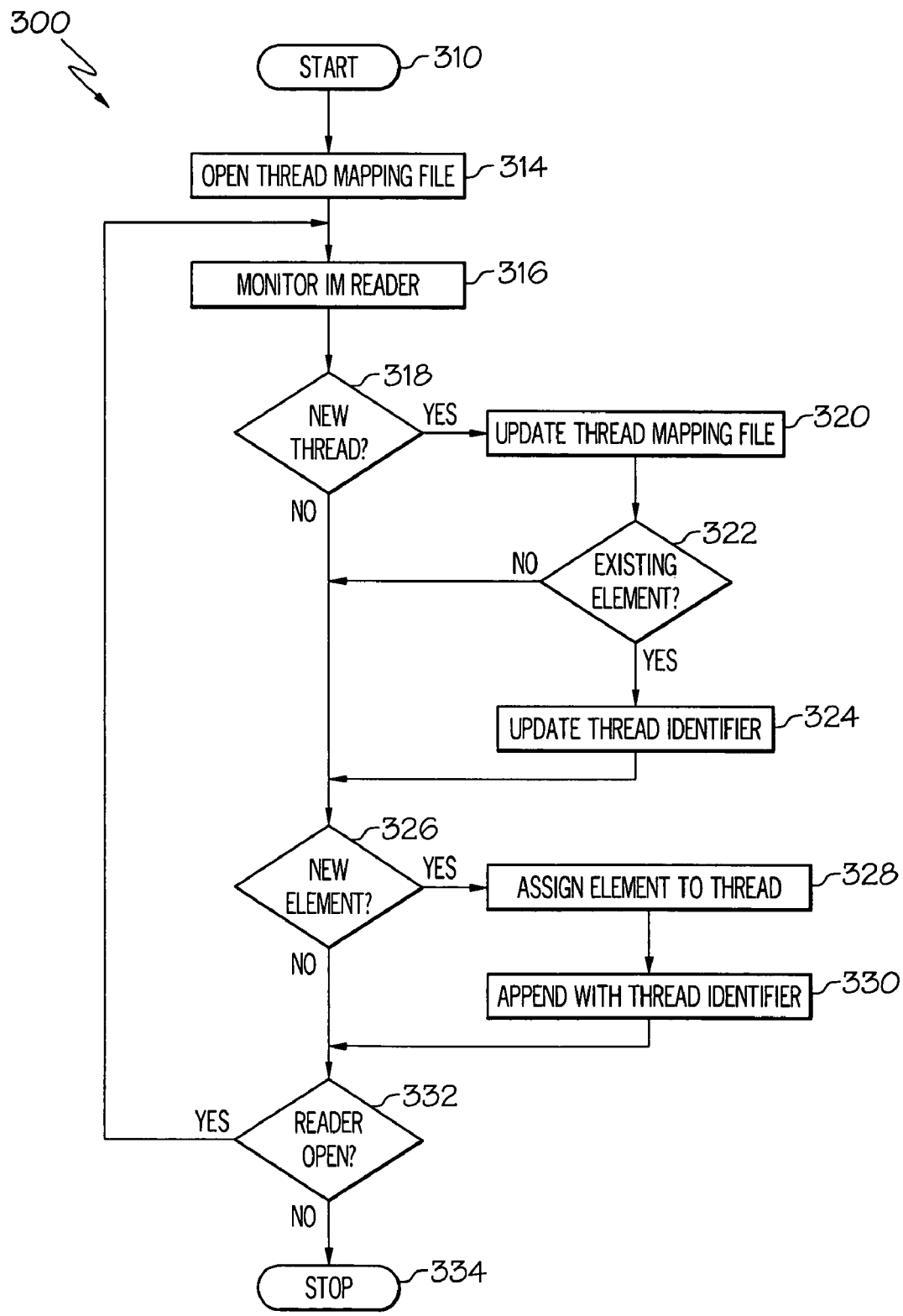
FIG. 3 is a flow chart of the Outgoing Message Component.

As shown in FIG. 3, Outgoing Message Component 300 starts (310) whenever IM Reader 230 opens, usually at the start of an IM session. Outgoing Message Component 300 opens Thread Mapping File 240 (314) and monitors IM Reader 230 for the creation of new threads and the creation of new conversation elements (316). When a participant indicates that a new thread has started (318), Outgoing Message Component adds a thread identifier listing to Thread Mapping File 240 (320). Participants may indicate the creation of a new thread in several ways, such as highlighting an existing text string and clicking on a "new thread" icon on a toolbar in the window of IM Reader 230. Other standard object-oriented procedures may be used to indicate a new thread as well, such as: highlighting, dragging and dropping existing text into a different window or sub-window; or activating a pop-up menu by right-clicking a mouse pointer over a region of selected text. Participants also may indicate a new thread prior to typing the text of a new conversation element. If a participant indicates a new thread for an existing conversation element (322), Outgoing Message Component 300 updates the thread identifier for the selected element (324). When a participant creates a new conversation element (326), Outgoing Message Component 300 assigns the conversation element to a thread (328) and appends a thread identifier to the message element (330). The thread identifier is added to the conversation element with some form of text mark-up, such as by adding the text "<ID-1>". Outgoing Message Component 300 determines the appropriate thread for the new conversation element from the listing of threads in Thread Mapping File 240 and the position of the cursor when the conversation element is typed. When different windows or sub-windows are used for each thread, Outgoing Message Component 300 assigns a thread based on which window or sub-window contains the new conversation element. When all threads are displayed in the same window, a new conversation element is presumed to belong to the same thread as the conversation element immediately preceding the new message element. The participant can place the cursor after a conversation element from the desired thread to continue the conversation on that topic. Outgoing Message Component 300 continues to run until IM Reader 230 closes (332), when it stops (334).

Figure 4:
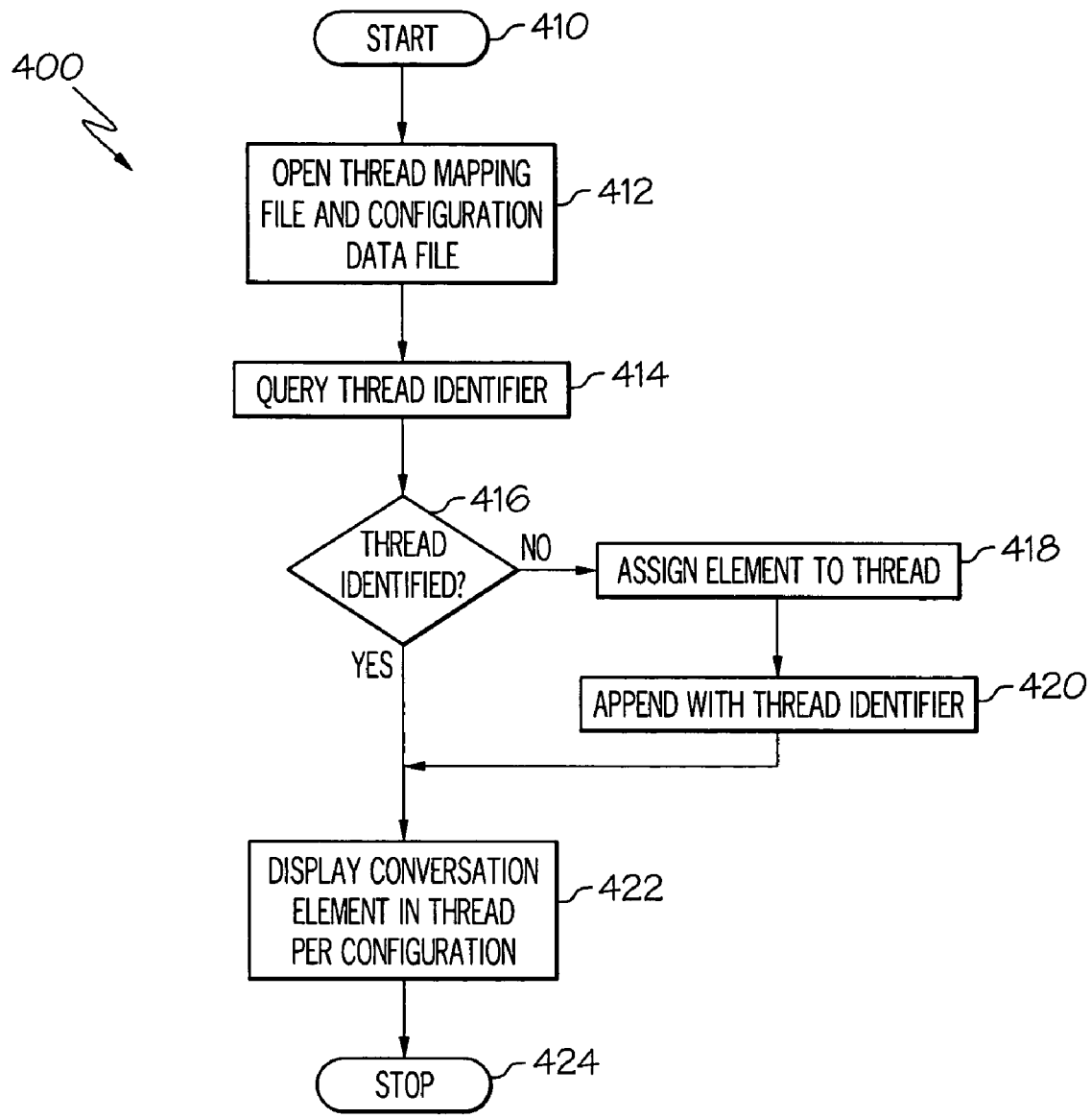
FIG. 4 is a flow chart of the Incoming Message Component.

As shown in FIG. 4, Incoming Message Component 400 starts whenever IM Reader 230 receives a new conversation element (410). Incoming Message Component 400 opens Thread Mapping File 240 and Configuration Data File 250 (412) and queries the incoming conversation element for a thread identifier (414). If the incoming conversation element has no thread identifier, it must be assigned to a thread (416). Incoming Message Component 400 assigns the unassigned message element to a thread (418) and appends a thread identifier to the conversation element (420). If the unassigned incoming conversation element is the first message element of the IM session, Incoming Message Component 400 assigns the incoming conversation element to a default first thread. If the IM session has existing conversation elements, the unassigned incoming conversation element is assigned to the most recent active thread from the threads listed in Thread Mapping File 240. Incoming Message Component 400 displays the incoming conversation element according to the settings in Configuration Data File 250 (422). Incoming Message Component 400 stops once the incoming conversation element is displayed (424).

Figure 5:
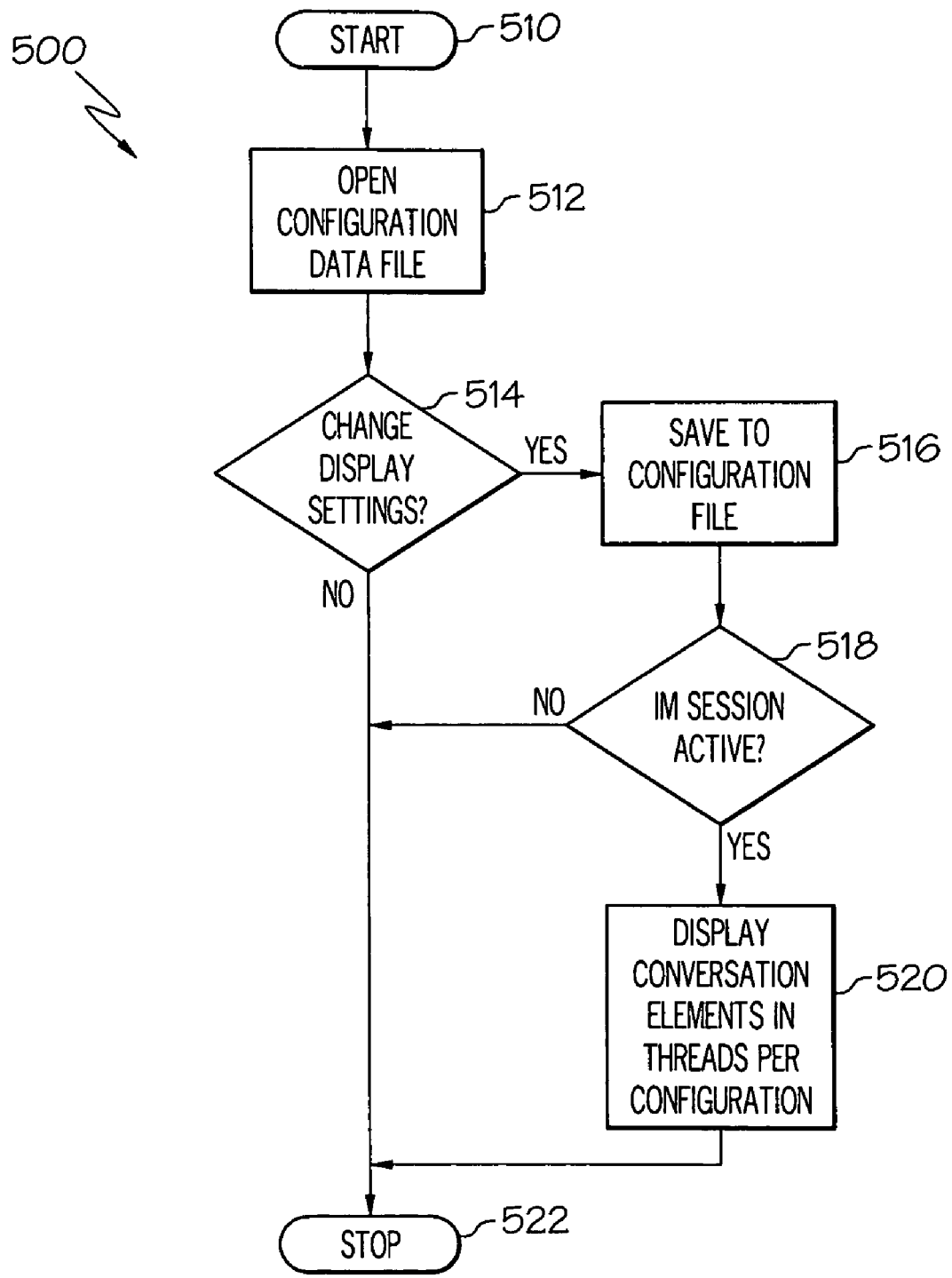
FIG. 5 is a flow chart of the Configuration Component.

As shown in FIG. 5, Configuration Component 500 starts whenever the participant indicates a setting change. The participant may indicate a setting change, for example, by selecting "settings" from a menu on IM Reader 230 or by selecting an icon on IM Reader 230 that corresponds to a specific configuration setting (510). Configuration Component 500 opens Configuration Data File 250 (512) and determines if the participant has changed a current display setting (514). If the participant has chosen to change a setting, the change is saved in Configuration Data File 250 (516). Configuration Component 500 determines if there is an active IM Session (518). If there is an active IM session, Configuration Component 500 displays all the message elements in threads according to the new configuration settings (520). Configuration Component 500 stops after saving any changes to the configuration and changing the display as indicated (522).

Figure 6A:
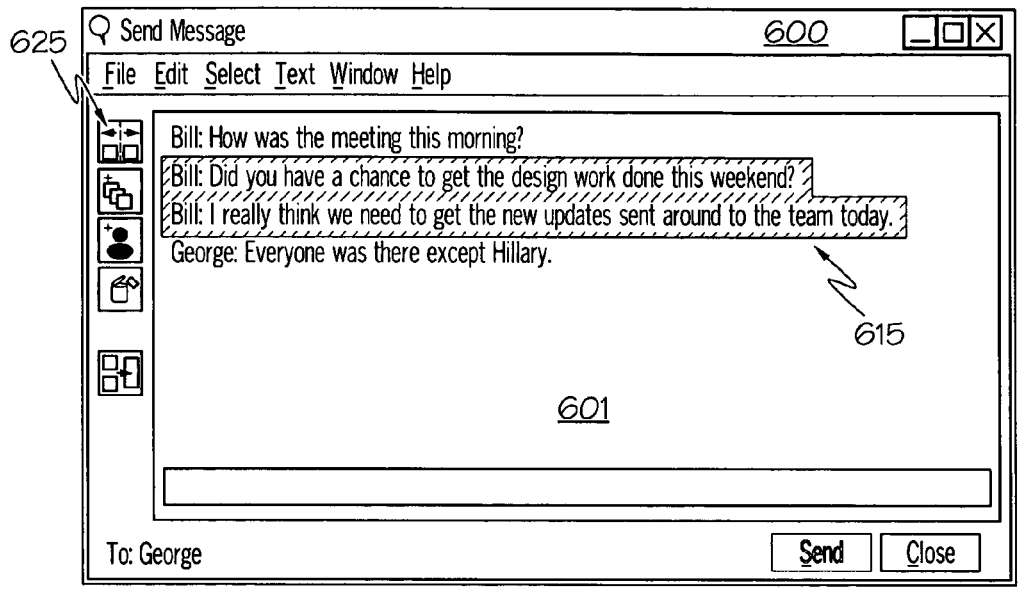
FIG. 6A illustrates an embodiment of IMTM displaying a single conversational thread.
Figure 6B:
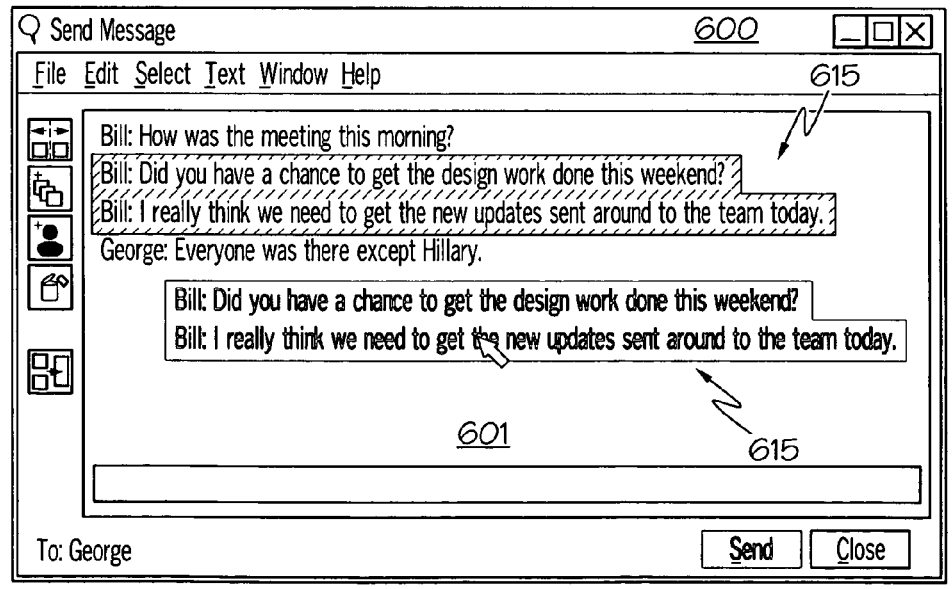
FIG. 6B illustrates an embodiment of IMTM displaying two conversational threads.
Figure 6C:
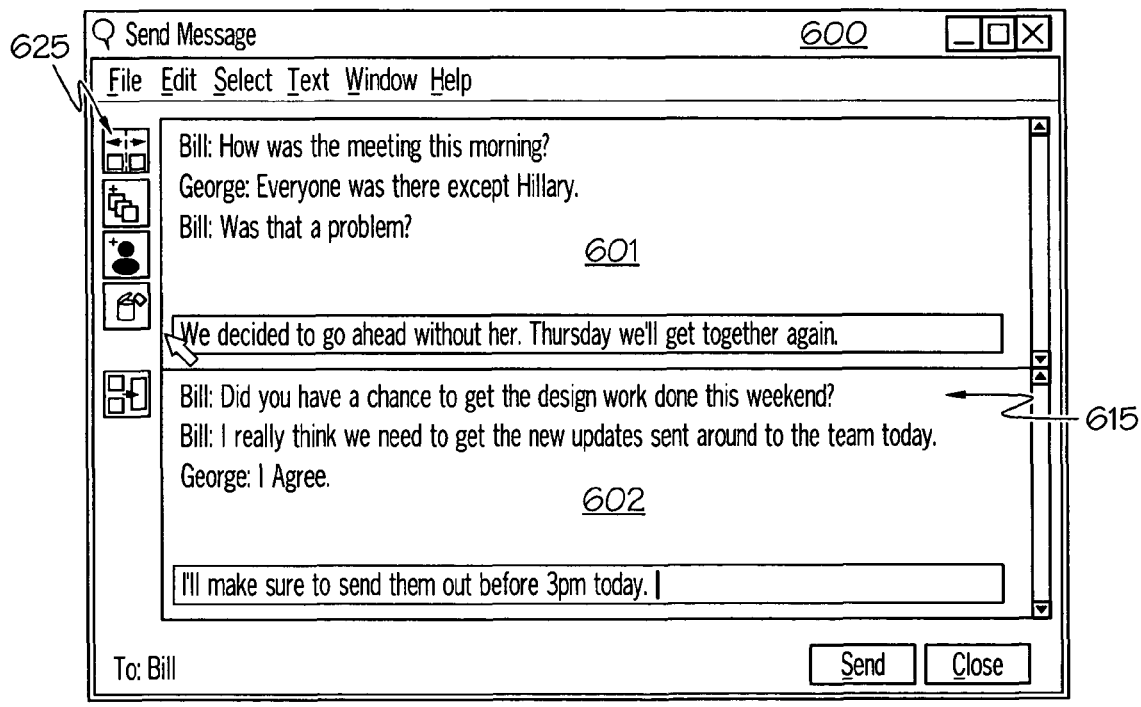
FIG. 6C illustrates two sub-windows for each of two separate conversations within a main window.

FIGS. 6A and 6B show one example of how IMTM 200 visually organizes conversation elements by thread in IM Reader window 600. FIG. 6A shows an IM session with a single thread, where all conversation elements appear in sub-window 601. If the participant determines conversation element 615 belongs in another thread, the participant selects conversation element 615 by highlighting a portion of text with a mouse. The participant selects "new thread" icon 625 with a mouse, as shown in FIG. 6A. Alternatively, the participant creates a new thread by using a mouse to "drag-and-drop" conversation element 615, as illustrated in FIG. 6B. As illustrated in FIG. 6C, IMTM 200 moves selected conversation element 615 to sub-window 602, while the non-selected conversation elements remain in sub-window 601. The participant can continue the IM session by adding new conversation elements in each thread.

An alternative embodiment of IMTM 200 provides other functions to the participant of an IM session. The additional functions are initiated by highlighting the text of conversation elements and either selecting an icon or choosing a function from a pop-up menu. Additional functions include opening an outgoing email message with a copy of the selected text in the body of the email message and copying the selected text to a separate file to be saved for a later time. The separate file may be a "chat-list" that saves the text after the IM session terminates. Other possible functions would allow the participant to save selected text from a message element into other types of software tools such as calendars and planners.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A computer implemented method for managing creation of new threads from existing conversation elements in an instant messaging session, comprising:
    establishing the instant messaging (IM) session at a computer including at least a first conversation element and a second conversation element for a first IM thread having a first IM thread identifier, the first IM thread identifier assigned to both the first and second conversation elements;
    displaying the first and second conversation elements consecutively in an IM reader window of a user interface of the computer;
    receiving a user input at the IM reader window indicating selection of the second conversation element for creation of a second IM thread within the IM session;
    responsive to receiving the user input, updating the second conversation element from the first IM thread identifier to a second IM thread identifier at the computer including mapping the second IM thread identifier to the second IM thread in an IM thread mapping file at the computer; and
    responsive to updating the second conversation element and without further user input, displaying the second conversation element in the IM reader window in the second IM thread, and removing the second conversation element from the first IM thread including visually removing the second conversation element from the first IM thread, where the second IM thread is visually distinguished from the first IM thread in the IM reader window.

2. The method of claim 1 wherein displaying the second conversation element in the IM reader window comprises displaying the first conversation element in a first sub-window of the IM reader window and displaying the second conversation element in a second sub-window of the IM reader window.

3. The method of claim 1, further comprising copying the second conversation element to a separate file.

4. The method of claim 3 wherein the separate file is an email message.

5. The method of claim 1 wherein receiving the user input comprises receiving a drag and drop input.

6. The method of claim 1 wherein receiving the user input comprises receiving a user selection of a new thread creation menu item of a menu of the IM reader window.

7. The method of claim 1 wherein displaying the second conversation element in the IM reader window in the second IM thread such that the second IM thread is visually distinguished from the first IM thread in the IM reader window comprises displaying the first and second conversation elements in the IM reader window where the first conversation element is displayed in a first color associated with the first IM thread and the second conversation element is displayed in a second color associated with the second IM thread.

8. An apparatus for managing the creation of new threads in instant messaging conversations, the apparatus comprising:
    a processor;
    a memory connected to the processor;
    an output device connected to the processor;
    an instant messaging (IM) program including an IM thread manager program in the memory operable to cause the processor to:
        establish an IM session at a computer including at least a first conversation element and a second conversation element for a first IM thread having a first IM thread identifier, the first IM thread identifier assigned to both the first and second conversation elements;
        display the first and second conversation elements consecutively in an IM reader window of a user interface of the computer;
        receive a user input at the IM reader window indicating selection of the second conversation element for creation of a second IM thread within the IM session;
        responsive to receiving the user input, update the second conversation element from the first IM thread identifier to a second IM thread identifier at the computer including to map the second IM thread identifier to the second IM thread in an IM thread mapping file at the computer; and responsive to updating the second conversation element and without further user input, display the second conversation element in the IM reader window in the second IM thread, and remove the second conversation element from the first IM thread, wherein removing the second conversation element from the first IM thread includes visually removing the second conversation element from the first IM thread, where the second IM thread is visually distinguished from the first IM thread in the IM reader window.

9. The apparatus of claim 8 wherein the IM program is further operable to cause the processor to display the second conversation element in the IM reader window comprises displaying the first conversation element in a first sub-window of the IM reader window and displaying the second conversation element in a second sub-window of the IM reader window.

10. The apparatus of claim 8 further wherein the IM program is further operable to cause the processor to copy the second conversation element to a separate file.

11. The apparatus of claim 10 wherein the separate file is an email message.

12. The apparatus of claim 8 wherein the IM program is operable to cause the processor to receive the user input as a drag and drop input.

13. The apparatus of claim 8 wherein the IM program is operable to cause the processor to receive the user input as a user selection of a new thread creation menu item of a menu of the IM reader window.

14. The apparatus of claim 8 wherein the IM program is operable to cause the processor to display the first conversation element in a first color associated with the first IM thread and display the second conversation element in a second color associated with the second IM thread.

15. A computer program product comprising a non-transitory computer-readable memory having an instant messaging (IM) computer program including computer program code for performing a method of managing creation of new threads in IM conversations upon being executed by a processor, comprising:

computer program code which when executed by the processor causes the processor to establish an IM session at a computer including at least a first conversation element and a second conversation element for a first IM thread having a first IM thread identifier, the first IM thread identifier assigned to both the first and second conversation elements;

computer program code which when executed by the processor causes the processor to display the first and second conversation elements consecutively in an IM reader window of a user interface of the computer;

computer program code which when executed by the processor causes the processor to receive a user input at the IM reader window indicating selection of the second conversation element for creation of a second IM thread within the IM session;

computer program code which when executed by the processor causes the processor to, responsive to receiving the user input, update the second conversation element from the first IM thread identifier to a second IM thread identifier at the computer including to map the second IM thread identifier to the second IM thread in an IM thread mapping file at the computer; and computer program code which when executed by the processor causes the processor to, responsive to updating the second conversation element and without further user input, display the second conversation element in the IM reader window in the second IM thread, and remove the second conversation element from the first IM thread, wherein removing the second conversation element from the first IM thread includes visually removing the second conversation element from the first IM thread, where the second IM thread is visually distinguished from the first IM thread in the IM reader window.

16. The computer program product of claim 15 wherein the computer program code operable to cause the processor to display the second conversation element in the IM reader window comprises computer program code operable to cause the processor to display the first conversation element in a first sub-window of the IM reader window and display the second conversation element in a second sub-window of the IM reader window.

17. The computer program product of claim 15 wherein the computer program code operable to cause the processor to receive the user input is further operable to cause the processor to receive a drag and drop input as the user input.

18. The computer program product of claim 15 wherein the computer program code operable to cause the processor to update the second IM thread identifier of the second conversation element is operable to cause the processor to update the second IM thread identifier of the second conversation element by changing a text mark-up used for the second IM thread identifier that is appended to the second conversation element.

19. The computer program product of claim 15 wherein the computer program code operable to cause the processor to receive the user input is further operable to cause the processor to receive the user input as a user selection of a new thread creation menu item of a menu of the IM reader window.

20. The computer program product of claim 15 wherein the computer program code operable to cause the processor to display the first and second conversation elements in the first and second threads, respectively, is operable to cause the processor to display the first conversation element in a first color associated with the first IM thread and display the second conversation element in a second color associated with the second IM thread.

* * * * *